US009015500B2

(12) United States Patent
Guo et al.

(10) Patent No.: US 9,015,500 B2
(45) Date of Patent: Apr. 21, 2015

(54) METHOD AND APPARATUS FOR USING DYNAMIC VOLTAGE AND FREQUENCY SCALING WITH CIRCUIT-DELAY BASED INTEGRATED CIRCUIT IDENTIFICATION

(71) Applicant: QUALCOMM Incorporated, San Diego, CA (US)

(72) Inventors: Xu Guo, San Diego, CA (US); Liangguo Shen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 109 days.

(21) Appl. No.: 13/743,239

(22) Filed: Jan. 16, 2013

(65) Prior Publication Data

US 2014/0201851 A1     Jul. 17, 2014

(51) Int. Cl.
*G06F 21/73*     (2013.01)
*G06F 1/26*     (2006.01)
*H04L 9/32*     (2006.01)
*H04L 9/08*     (2006.01)

(52) U.S. Cl.
CPC ............ *G06F 21/73* (2013.01); *G06F 1/26* (2013.01); *H04L 9/3278* (2013.01); *H04L 2209/12* (2013.01); *H04L 9/0866* (2013.01)

(58) Field of Classification Search
None
See application file for complete search history.

(56) References Cited

U.S. PATENT DOCUMENTS

| 7,681,103 | B2 * | 3/2010 | Devadas et al. ............... 714/752 |
|---|---|---|---|
| 7,962,539 | B2 | 6/2011 | Barak et al. |
| 8,285,767 | B2 | 10/2012 | Chandra |
| 8,347,091 | B2 * | 1/2013 | Nonaka et al. ............... 713/168 |
| 8,386,801 | B2 * | 2/2013 | Devadas et al. ............... 713/189 |
| 8,510,608 | B2 * | 8/2013 | Futa et al. ............... 714/52 |
| 8,700,916 | B2 * | 4/2014 | Bell et al. ............... 713/189 |
| 2003/0204743 | A1 * | 10/2003 | Devadas et al. ............... 713/200 |
| 2009/0254981 | A1 * | 10/2009 | Devadas et al. ............... 726/5 |

(Continued)

FOREIGN PATENT DOCUMENTS

| EP | 2081170 A1 | 7/2009 |
|---|---|---|
| WO | WO-2010123185 A1 | 10/2010 |

OTHER PUBLICATIONS

G. Edward Suh and Srinivas Devadas. 2007. Physical unclonable functions for device authentication and secret key generation. In Proceedings of the 44th annual Design Automation Conference (DAC '07). ACM, New York, NY, USA, 9-14. DOI=10.1145/1278480.1278484 http://doi.acm.org/10.1145/1278480.1278484.*

(Continued)

*Primary Examiner* — Michael R Vaughan
(74) *Attorney, Agent, or Firm* — Loza & Loza, LLP

(57) ABSTRACT

One feature pertains to a method that includes implementing a Physical Unclonable Function (PUF) circuit, and obtaining a first set of output bits from the PUF circuit by operating the PUF circuit at a first supply voltage level and/or first frequency. Then, at least one of the first supply voltage level is changed to a second supply voltage level and/or the first frequency is changed to a second frequency, where the second supply voltage level and the second frequency are different than the first supply voltage level and the first frequency, respectively. A second set of output bits is then obtained by operating the PUF circuit at the second supply voltage level and/or the second frequency, where the second set of output bits is in part different than the first set. Secure data is generated using the first set of output bits and the second sets of output bits.

21 Claims, 11 Drawing Sheets

(56) References Cited

U.S. PATENT DOCUMENTS

| | | | |
|---|---|---|---|
| 2009/0271860 A1* | 10/2009 | Nonaka et al. | 726/16 |
| 2010/0031065 A1 | 2/2010 | Futa et al. | |
| 2010/0281088 A1 | 11/2010 | Wilber | |
| 2011/0066670 A1 | 3/2011 | Yu | |
| 2011/0234241 A1* | 9/2011 | Lewis et al. | 324/649 |
| 2011/0299678 A1* | 12/2011 | Deas et al. | 380/28 |
| 2011/0317829 A1* | 12/2011 | Ficke et al. | 380/46 |
| 2013/0047209 A1* | 2/2013 | Satoh et al. | 726/2 |
| 2013/0276151 A1* | 10/2013 | Lewis et al. | 726/34 |
| 2013/0322617 A1* | 12/2013 | Orshansky | 380/28 |
| 2014/0091832 A1* | 4/2014 | Gotze et al. | 326/8 |

OTHER PUBLICATIONS

Maiti, A.; Schaumont, P., "Improving the quality of a Physical Unclonable Function using configurable Ring Oscillators," Field Programmable Logic and Applications, 2009. FPL 2009. International Conference on, vol., no., pp. 703,707, Aug. 31, 2009-Sep. 2, 2009.*

Choi K., et al., "Fine-Grained Dynamic Voltage and Frequency Scaling for Precise Energy and Performance Trade-off Based on the Ratio of Off-Chip Access to On-Chip Computation Times," Design, Automation and Test in Europe Conference and Exhibition, Feb. 20, 2004, pp. 4-9, vol. 1.

Maiti, et al., "The Impact of Aging on an FPGA-based Physical Unclonable Function", 21st International Conference on Field Programmable Logic and Applications, IEEE Computer Society, 2011, pp. 151-156.

Tuzzio, et al., "A Zero-Overhead IC Identification Technique Using Clock Sweeping and Path Delay Analysis," GLSVLSI '12, May 3-4, 2012, Salt Lake City, UT, pp. 95-98.

Helinski R., et al., "A physical unclonable function defined using power distribution system equivalent resistance variations," Design Automation Conference (DAC), 2009, 46th ACM/IEEE, Piscataway, NJ, USA, Jul. 26, 2009, pp. 676-681, XP031522443, ISBN: 978-1-60558-497-3, paragraph [0004].

International Search Report and Written Opinion—PCT/US2014/010711—ISA/EPO—Jul. 1, 2014.

Mansouri S.S., et al., "Ring Oscillator Physical Unclonable Function with Multi Level Supply Voltages," ARXIV, Jul. 17, 2012, XP055124564, 7 pages, Arxiv, the whole document.

Markovic D., et al.,"Ultralow-Power Design in Near-Threshold Region," Proceedings of the IEEE, Feb. 1, 2010, vol. 98 (2), pp. 237-252, XP011300406, ISSN: 0018-9219, paragraph [00VI].

Potkonjak M., et al., "Differential public physically unclonable functions: Architecture and applications," Design Automation Conference (DAC), 2011, 48th ACM/EDAC/IEEE, Jun. 5, 2011, pp. 242-247, XP031927748, ISBN: 978-1-4503-0636-2, paragraphs [0004], [0008].

Wei S., et al., "Integrated circuit security techniques using variable supply voltage," Design Automation Conference (DAC), 2011, 48th ACM,EDAC/IEEE, Jun. 5, 2011, pp. 248-253, XP031927664, ISBN: 978-1-4503-0636-2, the whole document.

\* cited by examiner

| Supply Voltage | Output Response String |
| --- | --- |
| 1.4 | 1 0 1 1 1 0 1 0 1 1 0 1 0 1 0 0 1 1 0 1 0 0 1 0 |
| 1.2 (Nom.) | 1 0 1 1 0 0 1 0 1 1 0 0 0 1 0 0 1 1 0 1 0 1 1 0 |
| 1.0 | 1 0 1 0 0 0 1 0 0 1 0 0 0 1 0 0 1 1 0 1 1 1 1 0 |
| 0.8 | 0 0 1 0 0 0 1 0 0 1 0 0 1 1 0 0 1 1 0 1 1 0 1 0 |
| 0.6 | 1 1 1 0 0 1 1 0 0 1 0 0 1 1 0 1 1 1 0 1 1 0 1 0 |

METHOD AND APPARATUS FOR USING DYNAMIC VOLTAGE AND FREQUENCY SCALING WITH CIRCUIT-DELAY BASED INTEGRATED CIRCUIT IDENTIFICATION

BACKGROUND

1. Field

Various features relate to integrated circuits, and more specifically, to using dynamic voltage scaling and frequency scaling techniques to enhance integrated circuit identification systems that use circuit-delay based physical unclonable functions.

2. Background

In the era of pervasive computing a lot of security issues exist related to software copyright protection, counterfeit ICs (i.e., chips), and system reliability. Software protection is a family of computer security techniques that are used to prevent the unauthorized copying of software. In other words, software must be able to determine whether the user is properly licensed to use it, and run only if this is the case. Another problem related to software protection is how to identify whether the chip or platform, on which the software is running, is a counterfeit chip. Counterfeit chips have proliferated throughout the industry and are a risk to the electronics supply chain. The product fallout from counterfeit semiconductors can range from small problems like dropped calls to much larger issues such as airplane crashes. Consequently, identifying and restricting the usage of counterfeit chips in the electronics supply chain is vital.

An on-chip Physical Unclonable Function (PUF) is a chip-unique challenge-response mechanism exploiting manufacturing process variations inside ICs. PUFs provide a mechanism to uniquely identify a hardware device based on intrinsic variations of physical components. When multiple chips are manufactured, the complex semiconductor process introduces slight variations that are beyond the control of the designer. For instance, even if two chips are manufactured from the same silicon wafer, circuit components (e.g., transistors) designed to be the same will probably differ in their silicon level features (e.g., gate length, threshold voltage value, gate oxide thickness, etc.) by microscopic amounts that may seem trivial. However, since these unique characteristics are uncontrollable and inherent to the physical device, quantifying them can produce an intrinsic identifier. Several different types of PUFs have been proposed based on exploration and analysis of silicon variations in circuit delays, such as ring oscillator based PUFs, arbiter PUFs, and path-delay analysis based PUFs. A PUF circuit receives a challenge as an input, and based on the physicals differences described above, the same PUF circuit may generate different response values in different chips.

FIG. 1 illustrates a schematic block diagram of one example of a circuit-delay based PUF circuit 102 found in the prior art. The specific PUF circuit 102 shown is commonly known as a ring oscillator PUF. A plurality of ring oscillators (ROs) 104 may be concurrently enabled and their outputs are sent to two or more switches (multiplexers) 106, 108. Notably, the ROs and other components are supplied with a static supply voltage 119 (e.g., nominal supply voltage or a higher "stress" supply voltage). A challenge serves as input to each switch 106, 108, which causes each switch 106, 108 to then select a single RO from among the plurality of ROs 104. The challenges sent to the switches 106, 108 are designed such that each switch 106, 108 selects a different RO. The selected ROs each have a slightly different resonating frequency associated with them due to slight semiconductor-level manufacturing variations, even though each may have been manufactured to be identical. The PUF output (response) is generated by a pair-wise comparison 114 of these selected ring oscillators' frequencies as measured/stored by the counters 110, 112. For example, if the first counter 110 detects a higher frequency than the second counter 112, then a logical "1" may be generated, otherwise a logical "0" may be generated. In this fashion, the comparisons made represent a challenge/response mechanism where the chosen RO pair is the challenge and the RO frequency comparison result is the response. The same challenge issued to different yet (almost) identically manufactured chips will lead to different response values. This in turn helps identify one chip from another even though the chips may have been manufactured to be the same.

One problem with circuit-delay based PUFs is high power consumption. The RO based PUF 102 described above, as well as other types of circuit-delay based PUFs, operate using static supply voltages (e.g., nominal supply voltage or higher "stress" supply voltage) and may have relatively high operating frequencies. For instance, in ring oscillator based PUF approaches, the oscillation frequency can be several hundred MHz in typical designs even with relatively less advanced technology nodes (e.g. 90 nm), and the corresponding power consumption cannot be ignored. As another example, in path-delay analysis based PUFs, under typical supply voltages the clock needed to analyze the max operating frequency of each data path can be in the GHz range, which is difficult to be generate accurately in small frequency steps and may also consume significant power.

Another problem with circuit-delay based PUFs is the large circuit area overhead needed to implement them. In order to get a sufficient amount of bits to generate a chip ID, many replicated circuit units (e.g., a myriad of ring oscillator pairs) may be needed. Each of these circuit units occupies valuable area on the active surface of an IC, which may be otherwise used for other valuable modules such as memory or processing logic.

Thus, there exists a need to improve circuit-delay based PUFs so that they consume less power and less area, yet also still provide the same level of security (e.g., still provide the same encryption strength and number of identifier/key bits).

SUMMARY

One feature provides a method operational within an electronic device that comprises implementing a Physical Unclonable Function (PUF) circuit, obtaining a first set of output bits from the PUF circuit by operating the PUF circuit at a first supply voltage level and/or first frequency, changing at least one of the first supply voltage level to a second supply voltage level and/or the first frequency to a second frequency, the second supply voltage level different than the first supply voltage level and the second frequency different than the first frequency, obtaining a second set of output bits by operating the PUF circuit at the second supply voltage level and/or the second frequency, the second set of output bits at least in part different than the first set of output bits, and generating secure data using at least a portion of the first set of output bits and at least a portion of the second set of output bits. According to one aspect, the method further comprises obtaining the first set of output bits and the second set of output bits in response to a same input challenge to the PUF circuit. According to another aspect, the method further comprises receiving the input challenge at the PUF circuit from a processing circuit. According to yet another aspect, the secure data is generated by concatenating at least the portion of the first set of output bits and the portion of the second set of output bits.

According to one aspect, the secure data is generated using a cryptographic function based on at least the portion of the first set of output bits and the portion of the second set of output bits. According to another aspect, the method further comprises reducing a circuit area occupied by the PUF circuit by varying at least one of an input supply voltage of the PUF circuit and/or an input frequency of the PUF circuit. According to yet another aspect, at least a portion of the circuit area is reduced by a factor N, the factor N equal to a number of different supply voltage and/or frequency level steps the PUF circuit is adapted to operate at. According to another aspect, the portion of the circuit area reduced is a circuit-delay based sample generation module. According to yet another aspect, the portion of the circuit area reduced is a number of delay paths.

According to one aspect, the PUF circuit is a circuit-delay based PUF circuit. According to another aspect, the PUF circuit is one of a ring oscillator based PUF circuit, an arbiter PUF circuit, or a delay-path analysis based PUF circuit. According to yet another aspect, the PUF circuit is the ring oscillator based PUF circuit, and the method further comprises selecting at least a pair of ring oscillators from a plurality of ring oscillators to obtain the first set of output bits, changing the first supply voltage level of the PUF circuit to the second supply voltage level, and selecting the pair of ring oscillators to obtain the second set of output bits.

According to one aspect, the PUF circuit is the arbiter PUF circuit, and the method further comprises selecting a circuit delay path from a plurality of circuit delay paths to obtain the first set of output bits, changing the first supply voltage level of the PUF circuit to the second supply voltage level, and selecting the circuit delay path to obtain the second set of output bits. According to another aspect, the method further comprises increasing the PUF circuit's sensitivity to semiconductor-level manufacturing variation to increase entropy of the PUF circuit. According to yet another aspect, increasing the PUF circuit's sensitivity to semiconductor-level manufacturing variation includes reducing a power level consumed by the PUF circuit by changing at least one of the first supply voltage level of the PUF circuit to the second supply voltage level and/or the first frequency to the second frequency, wherein the second supply voltage level is less than the first supply voltage level and the second frequency is lower than the first frequency.

Another feature provides an electronic device that comprises a Physical Unclonable Function (PUF) circuit, and a processing circuit communicatively coupled to the PUF circuit, the processing circuit adapted to obtain a first set of output bits from the PUF circuit by operating the PUF circuit at a first supply voltage level and/or first frequency, change at least one of the first supply voltage level to a second supply voltage level and/or the first frequency to a second frequency, the second supply voltage level different than the first supply voltage level and the second frequency different than the first frequency, obtain a second set of output bits by operating the PUF circuit at the second supply voltage level and/or the second frequency, the second set of output bits at least in part different than the first set of output bits, and generate secure data using at least a portion of the first set of output bits and at least a portion of the second set of output bits. According to one aspect, the processing circuit is further adapted to obtain the first set of output bits and the second set of output bits in response to a same input challenge to the PUF circuit. According to another aspect, a circuit area occupied by the PUF circuit is reduced by varying at least one of an input supply voltage of the PUF circuit and/or an input frequency of the PUF circuit. According to yet another aspect the PUF circuit is a ring oscillator based PUF circuit, and the processing circuit is further adapted to select at least a pair of ring oscillators from a plurality of ring oscillators to obtain the first set of output bits, change the first supply voltage level of the PUF circuit to the second supply voltage level, and select the pair of ring oscillators to obtain the second set of output bits.

According to one aspect, the processing circuit is further adapted to increase the PUF circuit's sensitivity to semiconductor-level manufacturing variation to increase entropy of the PUF circuit. According to another aspect, the processor further adapted to increase the PUF circuit's sensitivity to semiconductor-level manufacturing variation includes reduce a power level consumed by the PUF circuit by changing at least one of the first supply voltage level of the PUF circuit to the second supply voltage level and/or the first frequency to the second frequency, wherein the second supply voltage level is less than the first supply voltage level and the second frequency is lower than the first frequency.

Another feature provides an electronic device that comprises means for implementing a Physical Unclonable Function (PUF), means for obtaining a first set of output bits from the means for implementing the PUF by operating the means for implementing the PUF at a first supply voltage level and/or first frequency, means for changing at least one of the first supply voltage level to a second supply voltage level and/or the first frequency to a second frequency, the second supply voltage level different than the first supply voltage level and the second frequency different than the first frequency, means for obtaining a second set of output bits by operating the means for implementing the PUF at the second supply voltage level and/or the second frequency, the second set of output bits at least in part different than the first set of output bits, and means for generating secure data using at least a portion of the first set of output bits and at least a portion of the second set of output bits. According to one aspect, the electronic device further comprises means for obtaining the first set of output bits and the second set of output bits in response to a same input challenge to the means for implementing the PUF. According to another aspect, a circuit area occupied by the means for implementing the PUF is reduced by varying at least one of an input supply voltage of the means for implementing the PUF and/or an input frequency of the means for implementing the PUF. According to yet another aspect, at least a portion of the circuit area is reduced by a factor N, the factor N equal to a number of different supply voltage and/or frequency level steps the means for implementing the PUF is adapted to operate at.

According to one aspect, the means for implementing the PUF is one of a ring oscillator based PUF circuit, an arbiter PUF circuit, or a delay-path analysis based PUF circuit. According to another aspect, the electronic device further comprises means for increasing the means for implementing the PUF's sensitivity to semiconductor-level manufacturing variation to increase entropy of the means for implementing the PUF. According to yet another aspect, the means for increasing the means for implementing the PUF's sensitivity to semiconductor-level manufacturing variation includes means for reducing a power level consumed by the means for implementing the PUF by changing at least one of the first supply voltage level of the means for implementing the PUF to the second supply voltage level and/or the first frequency to the second frequency, wherein the second supply voltage level is less than the first supply voltage level and the second frequency is lower than the first frequency.

Another feature provides a computer-readable storage medium having one or more instructions stored thereon, which when executed by at least one processor causes the processor to implement a Physical Unclonable Function (PUF), obtain a first set of output bits from the PUF by operating the PUF at a first supply voltage level and/or first frequency, change at least one of the first supply voltage level to a second supply voltage level and/or the first frequency to a second frequency, the second supply voltage level different than the first supply voltage level and the second frequency different than the first frequency, obtain a second set of output bits by operating the PUF at the second supply voltage level and/or the second frequency, the second set of output bits at least in part different than the first set of output bits, and generate secure data using at least a portion of the first set of output bits and at least a portion of the second set of output bits. According to one aspect, the computer-readable storage medium has additional instructions, which when executed by the processor cause the processor to further obtain the first set of output bits and the second set of output bits in response to a same input challenge to the PUF.

DETAILED DESCRIPTION

Figure 1:
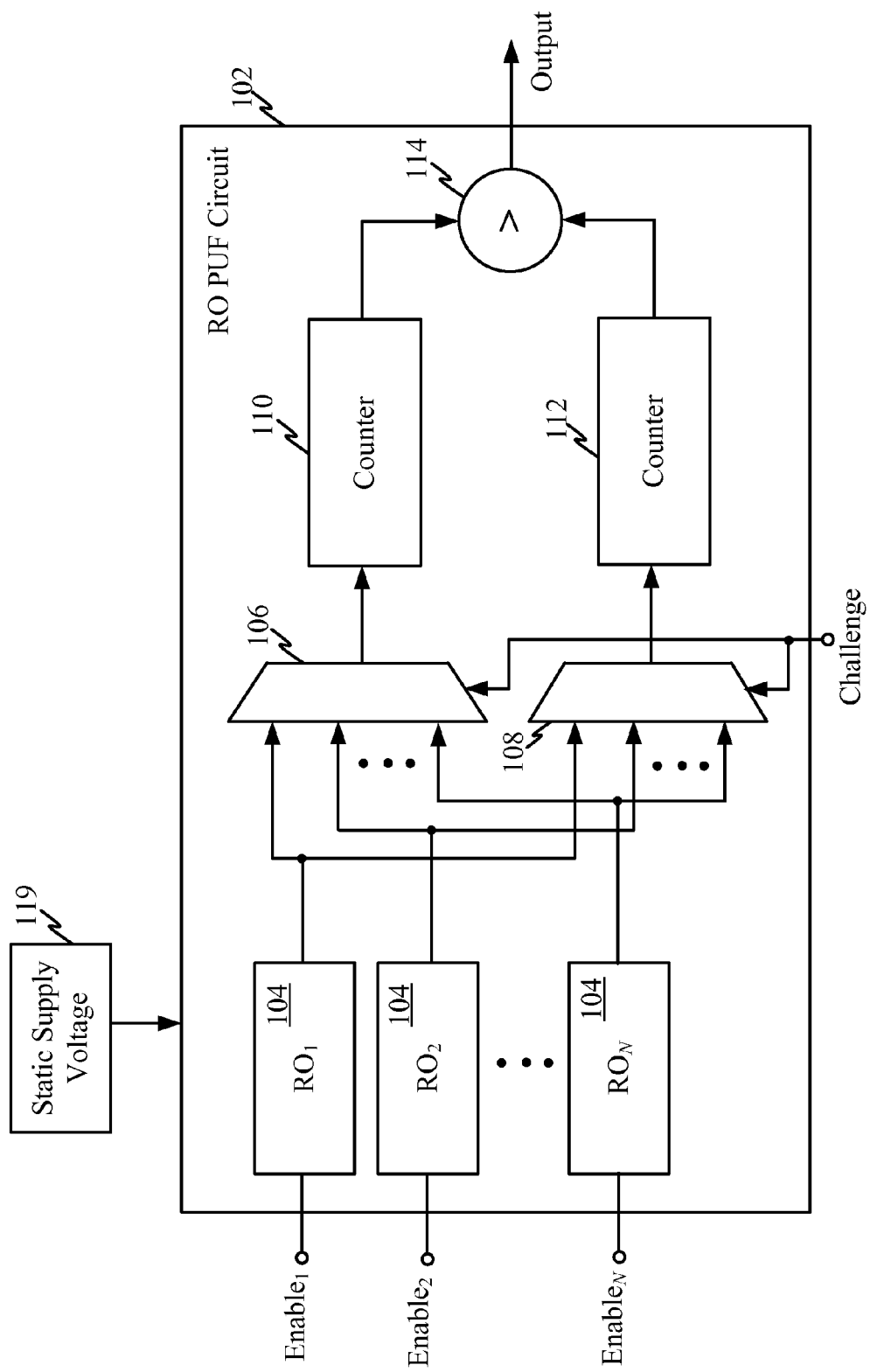
FIG. 1 illustrates a schematic block diagram of one example of a circuit-delay based PUF circuit found in the prior art.

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. As used herein, the terms "chip" and "integrated circuit" are used interchangeably.

Overview

The maximum operating frequency or circuit critical path delay of a circuit (e.g. a PUF circuit) will vary as the circuit's supply voltage varies. For example, the circuit's maximum operating frequency will increase as the circuit's supply voltage is increased, which causes the circuit to consume more power. Alternatively, a circuit's maximum operating frequency will decrease as the circuit's supply voltage is decreased, which causes the circuit to consume less power. Notably, this relationship of decreasing or increasing frequency (or path delay) with decreasing or increasing supply voltage, respectively, is a non-linear relationship. Moreover, decreasing the supply voltage (to a certain extent) causes a circuit to be more sensitive to semiconductor-level manufacturing variations yet still robust to environmental variations since the latter may be mitigated, in part, by differential circuit techniques.

To address the high power consumption and large area overhead problems of existing circuit delay based PUF solutions, one aspect provides for running a PUF while performing voltage/frequency scaling. The supply voltage may be reduced to a certain range to satisfy low power requirements of battery powered systems, and still achieve the same functionality of PUFs that operate at higher supply voltages. Due to the non-linear relationship between the maximum operating frequency and the supply voltage, and also the increased sensitivity to manufacturing variations as the supply voltage is lowered, the supply voltage may be reduced/decreased by several small steps and at each step the PUF may be run once to generate different output bits (e.g., security bits for chip ID extraction). This means that with a sufficiently large change in the supply voltage, the PUF output may also change. Thus, for the same PUF circuit different output response data may be obtained depending on the different voltage/frequency supplied.

As a result, the number of PUF circuits may be reduced since each PUF circuit is capable of providing multiple, unique outputs that depend on the supply voltage and/or the frequency at which the PUF is operated. Moreover, low power management schemes that already exist on a platform (e.g., processor) to reduce supply voltage may be taken advantage of to reduce the supply voltage of circuit-delay based PUF circuits. Moreover, the disclosure made herein can be generalized and work effectively in several different types of circuit-delay based PUF circuits. In summary, circuit-delay based PUF chip identification techniques may be enhanced to reduce power consumption and lessen the chip area overhead.

Exemplary PUF Circuits Utilizing Dynamic Voltage Frequency Scaling

Figure 2:
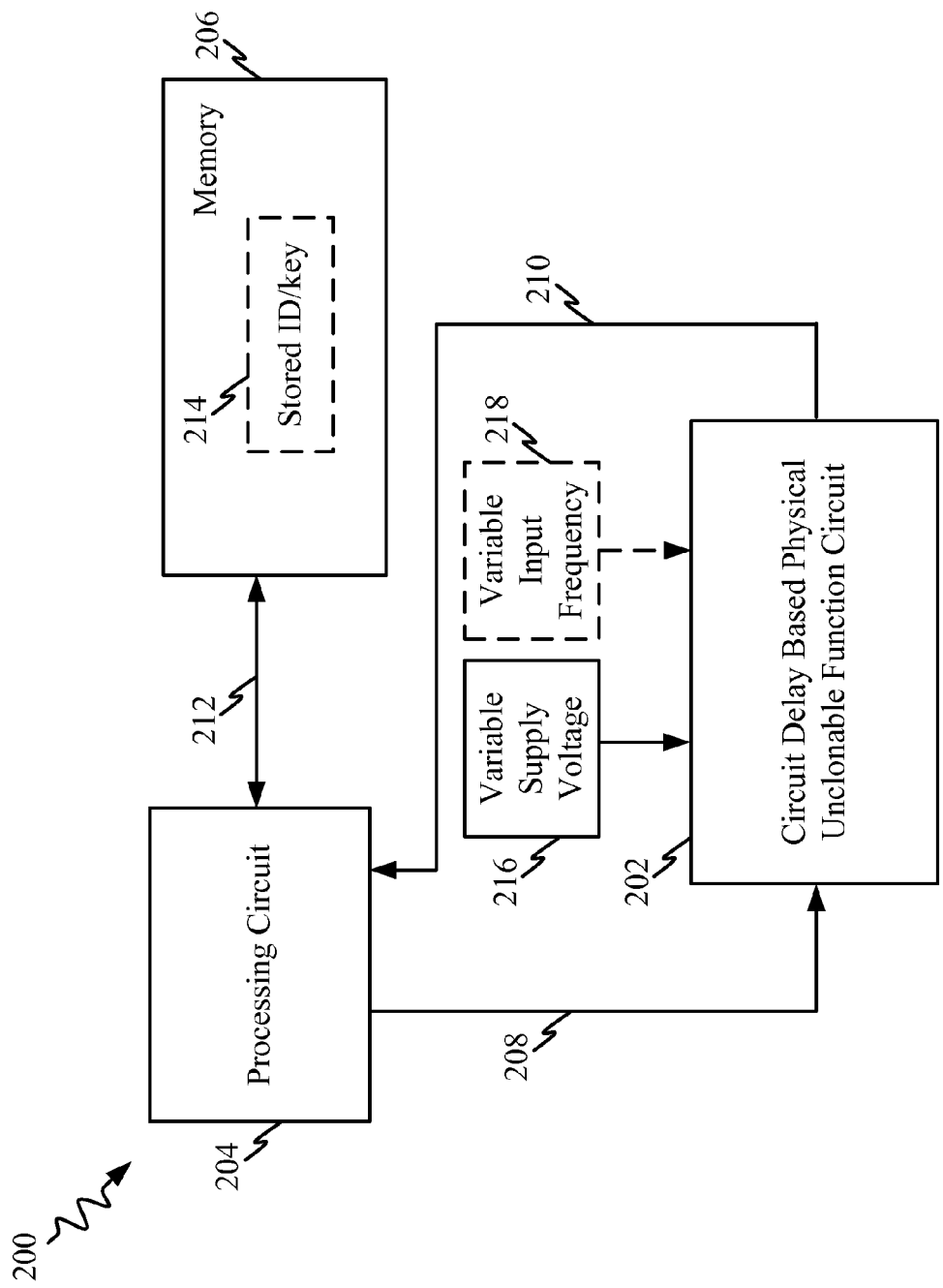
FIG. 2 illustrates a high-level schematic view of a circuit-delay based PUF chip identification apparatus.

FIG. 2 illustrates a high-level schematic view of a circuit-delay based PUF chip identification apparatus 200 according to one aspect of the disclosure. The apparatus 200 resides within an electronic device (not shown), such as a mobile phone or computer, and includes a circuit-delay based PUF circuit 202, a processing circuit 204, and/or a memory circuit 206. The PUF circuit 202 may be any circuit-delay based PUF, such as, but not limited to, a ring oscillator based PUF, an arbiter PUF, and/or a path-delay analysis based PUF. According to one aspect, the processing circuit 204 represents at least one processor that may be located on an IC(s) that is different from the IC(s) that contain the circuit-delay based PUF circuit 202 and the memory circuit 206. According to another aspect, the processing circuit 204 may be a processing circuit that is located on the same IC as the circuit-delay based PUF circuit 202 and/or the memory circuit 206. The memory circuit 206 may be any type of volatile or nonvolatile memory, including, but not limited to, read only memory (ROM), FLASH memory, SRAM, SDRAM, etc.

The PUF circuit 202 receives an input challenge 208 that may be generated by the processing circuit 204. The PUF circuit 202 generates a unique output response 210 based on the input challenge, which may then be supplied to the processing circuit 204 for further processing. The processing circuit 204, which is communicatively coupled 212 to the memory circuit 206, may compare the response 210 received to secure data (e.g., identifier/key 214) that may be stored in the memory circuit 206 in order to, for example, authenticate software and/or IC hardware.

Notably, the PUF circuit 202 operates using a variable supply voltage 216 that may be dynamically adjusted. An optional, variable frequency input 218 may also be provided depending on the specific type of PUF circuit 202 being used. (For example, path-delay analysis based PUFs may require a frequency input). According to one aspect, the variable supply voltage 216 may be adjusted in discrete steps. As just some non-limiting examples, the variable supply voltage 216 may be adjusted in 0.01 volt, 0.02 volt, 0.05 volt, 0.1 volt, and/or 0.2 volt steps. According to another example, the variable supply voltage 216 may be adjusted in a smooth, continuous fashion offering more precise control of the supply voltage value. Many host systems, e.g., processors, generally take advantage of dynamically varying the processor circuit's clock speed to reduce power consumption if certain use conditions are present. Any such systems that allow for the supply voltage to be varied may be taken advantage of by the PUF circuit 202 to dynamically vary the PUF circuit's 202 own supply voltage.

As will be described in greater detail below, dynamically varying the input supply voltage to the circuit-delay based PUF circuit 202 provides an additional dimension of entropy into the system that can be utilized to reduce the number of circuit components necessary to achieve the same level of encryption security (e.g., generate the same number of unique, random bits). Moreover, dynamically decreasing the input supply voltage relative to a static nominal supply voltage will also reduce power consumption by the PUF circuit 202.

Figure 3:
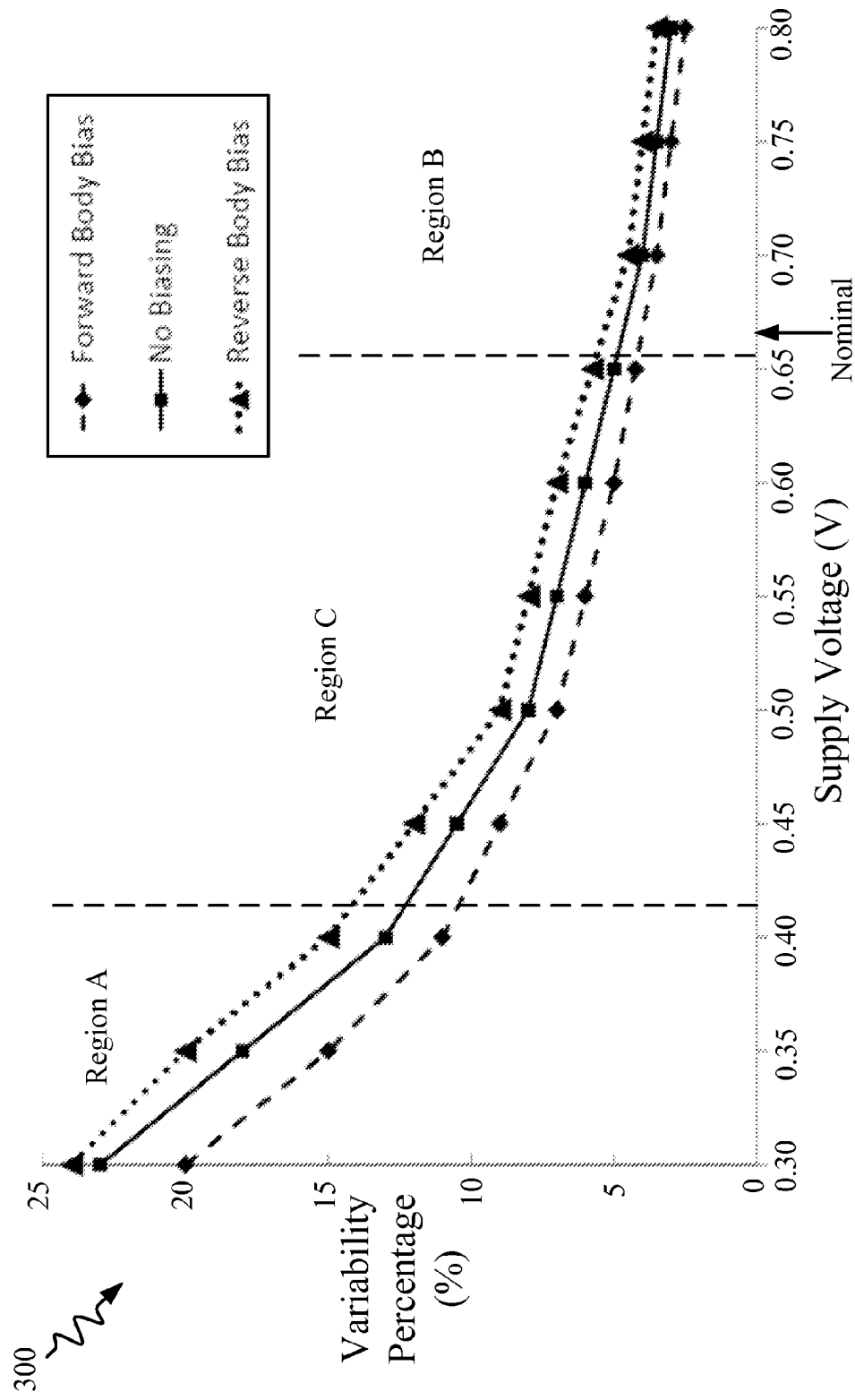
FIG. 3 illustrates one example of a graph that shows the variability of circuit-delay based PUF outputs as the supply voltage changes.

FIG. 3 illustrates one example of a graph 300 that shows the variability of circuit-delay based PUF outputs as the supply voltage changes. The graph 300 includes three lines: one represents the PUF circuit operating with a forward body bias; another represent the PUF circuit operating with a reverse body bias; and another represents the PUF circuit operating with no body bias. The variability axis represents the variability of a PUF circuit's output response to the same input challenge. For example, a PUF circuit X having a variability of 10% will generate an output response that is the same 90% of the time but different 10% of the time.

This variability is caused by at least two significant sources. First, IC manufacturing leads to uncontrollable and random differences at the semiconductor level of circuit components (e.g., transistor threshold level, gate oxide thickness, gate length, etc.) between chips that may cause the same PUF circuits on different chips to generate different output responses to the same input challenge. Second, environmental effects (e.g., temperature, radiation, voltage, etc.) may also cause some variability in the output responses of the PUF circuits. For example, a PUF circuit operating at different temperatures may produce different output responses given same input challenge.

For chip identification applications, the first source (i.e., semiconductor-level manufacturing variation) of variability is desirable because it leads to increased output response variation that is typically repeatable (i.e., the same input challenge will usually produce the same unique output response). By contrast, the second source (environmental effects) of variability is undesirable because the output response variation is not necessarily repeatable and instead may change depending on the changing environmental conditions. The variability percentage values shown in FIG. 3 reflect a contribution from at least both of these sources of variability.

Region A represents the portion of the graph 300 where the supply voltage to the circuit-delay based PUFs are relatively low compared to the nominal supply voltage of the chip. Powering the PUF circuits with such low supply voltages dramatically reduces power consumption and dramatically increases the variability of the PUF circuits. However, while the reduced power consumption is desirable, the increased variability of the PUF circuits is largely driven by increased sensitivity to environmental effects, which as described above is undesirable and problematic.

Region B represents the portion of the graph 300 where the supply voltage to the circuit-delay based PUFs are relatively high (e.g., at or greater than nominal supply voltage). PUF circuits powered by high supply voltages consume relatively greater power but are also more immune to environmental effects. However, high power consumption is clearly undesirable, especially for portable applications. Moreover, although the higher voltage supplies in this region provide greater immunity to environmental effects, the low levels of overall variability including variability caused by sensitivity to semiconductor-level manufacturing variation is undesirable. Greater overall levels of variability driven by sensitivity to manufacturing variation is instead desirable because it allows for greater entropy that causes different output responses to the same input challenges across a greater number of chips. Many prior art circuit-delay based PUFs are commonly supplied by fixed supply voltages within this region.

Region C represents the portion of the graph 300 where the supply voltages may still be less than the nominal supply voltage of the chip yet they are greater than the supply voltages found in Region A. Operating the PUF circuits in Region C reduces power consumption by the PUF circuits compared to operating such circuits at typical, nominal supply voltage levels (e.g., Region B). Moreover, reducing the supply voltages to levels within region B increases the overall variability of the PUF output responses where such increases in variability are driven mainly by sensitivity to manufacturing variation and not sensitivity to environmental effects. Thus, according to one aspect, circuit-delay based PUFs are dynamically supplied with voltages that are less than the nominal supply voltage of the chip in order to reduce power consumption and also increase PUF output response variability between chips. The boundaries of the regions (Regions A, B, and C) may be determined based on empirical testing for a given chip design.

Figure 4:
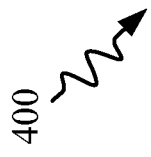
FIG. 4 illustrates a table showing an output response bit string generated by a circuit-delay based PUF circuit in response to input challenges.

FIG. 4 illustrates a table 400 showing an output response bit string generated by a circuit-delay based PUF circuit (e.g., PUF circuit 202) in response to input challenges. Notably, the table 400 illustrates how the output stable response bits may change (flip from a logical "1" to a "0" or vice versa) as the supply voltage to the PUF circuit 202 is dynamically varied. In the example shown, 1.2 volts is assumed to be the nominal supply voltage to the PUF circuit 202 and the output bit string at this supply voltage is treated as the baseline output response. Output response bit values that change with respect to this baseline response at different supply voltages are underlined as shown. Thus, in one instance, three stable response bits have flipped with respect to the baseline nominal voltage at the higher 1.4 volt supply voltage. As another instance, three other stable response bits have flipped with respect to the baseline nominal voltage once the supply voltage is lowered down to 1.0 volts. The PUF circuit 202 may be assumed to be operating in Region C shown in FIG. 3 at this supply voltage, and thus consumes less power and provides more PUF circuit output variability.

As the voltage supply is lowered even further, more output response bits may flip. In the illustrated example, at 0.8 volts 6 stable response bits have flipped with respect to the baseline nominal voltage, and at 0.6 volts 8 stable response bits have flipped with respect to the baseline. Note that due to, in part, the non-linear relationship between the voltage level supplied and the corresponding change in operating frequency of the PUF circuit 202, it is impossible to predict which output response bits will change. For example, some of the bits at the 0.6 volt supply have flipped back to the nominal voltage supply's values after having changed at the 0.8 volt supply level. Based on empirical testing, it may be found that in one example the voltage supply levels between 0.6 volts-1.15 volts for one PUF circuit 202 allows the circuit to operate in Region C shown in FIG. 3, but that lowering the voltage supply below 0.6 volts casts the PUF circuit into the undesirable Region A where PUF output response variability is significantly driven by environmental effects.

In particular, it may be appreciated that each output response bit string shown in FIG. 4 may be used to generate a unique output response using the same PUF circuit at different voltage supply levels. For example, the output bit strings shown in FIG. 4 may be input into a cryptographic function, such as a hash function, which in turn outputs a unique bit string that cannot be practically used to predict the input. The output responses of the PUF circuit are repeatable in that the same input challenges at the same voltage supply level should generate the same observed output response. Moreover, due to the nonlinearity described above, the changes in the output response of the PUF circuit 202 at a given supply voltage level may not be predicted based on another voltage supply level. Thus, varying the voltage supply level of the PUF circuit offers another dimension of entropy that can be utilized to generate unique output responses by operating the PUF circuit 202 multiple times, each time at a different supply voltage level.

Consequently, the total number of PUF circuits needed may be reduced yet the same level of security (e.g., number of bits generated) may remain the same. For example, a ring oscillator based PUF that uses a typical, static supply voltage may require 128 ring oscillators to generate a 128 bit output response string, which may be used as a 128 bit key or chip identifier. However, by using the approaches described herein, a ring oscillator based PUF (e.g., PUF circuit 202) having just 32 ring oscillators may be used to generate the same number of 128 bits if the supply voltage is dynamically varied between four steps (e.g., 1.2 volt, 1.0 volt, 0.8 volt, and 0.6 volt) and the PUF circuit 202 is run/operated each time at the different supply voltage step levels. Varying the voltage supply to four distinct voltage step levels and rerunning the PUF circuit 202 at each step level may result in four different, unique 32 bit output responses, for example, as shown in FIG. 4. The chip area overhead used by 32 ring oscillators is considerably less (e.g., may be ¼$^{th}$ the chip area) than the chip area overhead used by 128 ring oscillators. Of course such chip area reduction is not limited to ring oscillator based PUFs but instead applies to any circuit-delay based PUF (e.g., arbiter PUF, path-delay analysis based PUF, etc.).

In the example shown, the voltage supply is adjusted in 0.2 volt steps. However, as described above, the voltage supply may be adjusted in any stepwise increment value or even in a smooth, continuous fashion depending on the supply voltage circuit design. Generally, if a PUF circuit's 202 voltage supply is adjusted in N steps so that N unique output response are obtained from the same PUF circuit 202, then the total number of PUF circuits (or portions thereof such as ring oscillators, component delay paths, etc.) needed to implement the same level of security (e.g., number of bits) may be reduced by a factor of N. Moreover, according to one aspect, the output response bit strings generated by the PUF circuit 202 may be input into a cryptographic function (e.g., hashing function) to generate unique keys/identifiers of various bit lengths. According to another aspect, the output bit strings may be used directly as a key/identifier.

Ring Oscillator Based PUF Circuit Example

Figure 5:
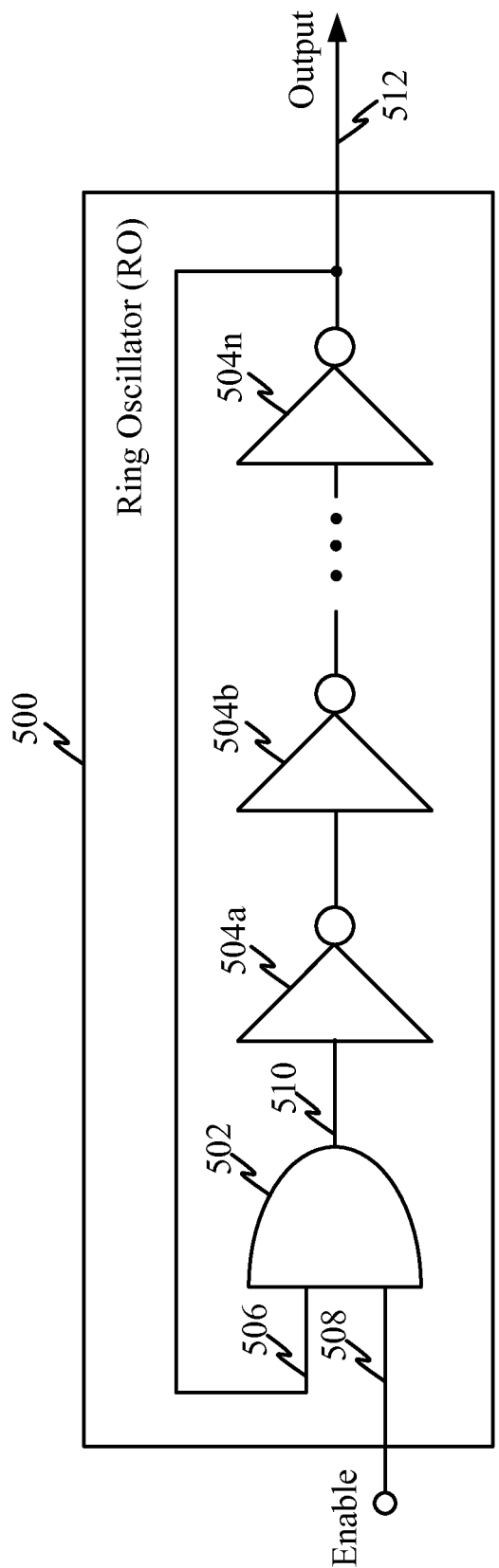
FIG. 5 illustrates a schematic block diagram of a ring oscillator.

FIG. 5 illustrates a schematic block diagram of a ring oscillator 500 according to one aspect. The RO 500 includes an AND gate 502 and an odd number of inverters 504*a*, 504*b*, . . . 504*n*. The AND gate 502 has at least two input terminals 506, 508 and an output terminal 510. The AND gate's output terminal 510 may be input into the first inverter 504*a*. The inverters 504*a*, 504*b*, . . . 504*n* are then connected in series as shown. The output 512 of the RO 500 is then coupled to one of the input terminals 506 of the AND gate. The other input terminal 508 is coupled to an Enable signal that may be, for example, controlled by a processing circuit similar to the processing circuit 204 shown in FIG. 2. Referring to FIG. 5, if the RO 500 is sufficiently powered and the Enable signal is high (e.g., logical value "1"), the RO output 512 will toggle back and forth between logical values (e.g., between "1" and "0").

Figure 6:
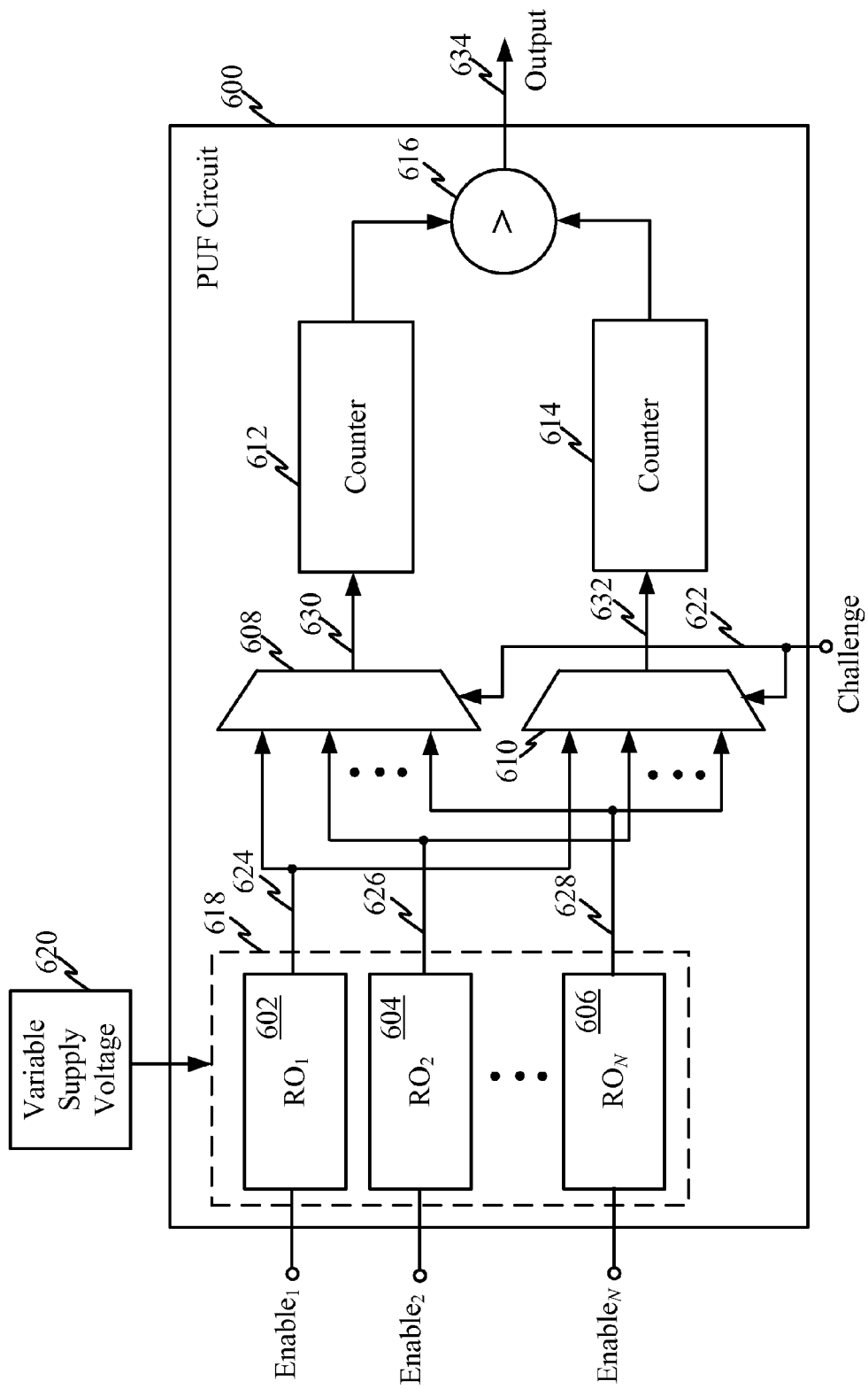
FIG. 6 illustrates a schematic block diagram of a ring oscillator based PUF circuit.

FIG. 6 illustrates a schematic block diagram of a ring oscillator based PUF circuit 600 according to one aspect. The ring oscillator based PUF circuit 600 may be just one example of the circuit-delay based PUF circuit 202 shown in FIG. 2 that can utilize a varying voltage supply to provide additional, unique output responses. The circuit 600 includes a plurality of N (where N is any integer number equal to or greater than two) ROs 602, 604, 606, a first switch 608, a second switch 610, a first counter 612, a second counter 614, and a comparator 616. The ROs 602, 604, 606 may be, for example, the RO 500 shown in FIG. 5. The ROs 602, 604, 606 comprise a circuit-delay based sample generation module 618, and are supplied by a variable supply voltage 620 capable of providing a supply voltage in varying steps. The ROs 602, 604, 606 may be enabled selectively (i.e., sometimes turned ON and sometimes turned OFF) using one or more Enable signals shown in FIG. 6 (i.e., Enable$_1$, Enable$_2$, Enable$_N$).

The PUF circuit 600 may generate a key or identifier bit string. For example, the PUF circuit 600 may receive a challenge 622 from a processing circuit, such as the processing circuit 204 shown in FIG. 2. Referring to FIG. 6, the challenge 622 may cause two ROs out of the plurality of ROs 602, 604, 606 to be selectively activated/enabled by turning ON the appropriate Enable signals (e.g., two of Enable$_1$, Enable$_2$, . . . Enable$_N$). The challenge 622 will also cause the two switches 608, 610 to select and pass through the two different RO outputs of the plurality of RO outputs 624, 626, 628 that are selectively activated/enabled. Thus, each switch 608, 610 provides one RO signal 630, 630 to a counter 612, 614. The frequency of the RO outputs 630, 632 serve to increase the values of their respective counters 612, 614. Due to small differences between the ROs selected, the RO outputs 630, 632 will have slightly different frequencies. As such, the counters 612, 614 will change at different rates and have different counter values after a predefined period of time. The counters 612, 614 are then compared by the comparator circuit 616 and an output signal 634 is generated based on the comparison. For example, if the first counter's 612 value is greater than the second counter's 614 value, then a logical "1" may be generated, otherwise a logical "0" may be generated. This process may be performed a plurality of times, each time possibly selecting different ROs 602, 604, 606 for comparison, until an identifier or key of sufficient length (e.g., bit string) is generated.

By varying the supply voltage to the ROs 602, 604, 606, different output response values 634 may be obtained by the same RO pairs that are selected by any one particular input challenge 622. For example, a particular input challenge 622 may cause the selection of the RO pair 602, 604 for comparison. If the variable supply voltage 620 provides a 1.2 volt supply, the difference between the RO pair 602, 604 output frequencies may be such that a logical "1" is generated as an output response 634 because $RO_1$ 602 has a higher operating frequency than $RO_2$. However, the supply voltage may then be reduced down to 0.8 volts, which causes the operating frequency of both ROs 602, 604 to drop (i.e., the frequencies are scaled down). Not only will the reduction in operating frequency save power, but due to nonlinearities and random behavior, the drop in supply voltage may cause the operating frequency of $RO_1$ 602 to drop more than the operating frequency of $RO_2$ 604, so that the operating frequency of $RO_2$ 604 is now greater than $RO_1$'s 602. This causes the PUF circuit 600 to generate a logical "0" as an output response 634. Since this change cannot be predicted (yet is repeatable every time $RO_1$ and $RO_2$ are compared at 0.8 volts), the PUF circuit 600 is demonstrably capable of producing an entirely new and unique output response bit string based on the particular voltage supply level provided.

The above phenomenon is not unique to just ring oscillator based PUF circuits, but instead may be extended in principle to all circuit-delay based PUF circuits. Examples for arbiter PUF circuits and path-delay analysis based PUF circuits are provided below as non-limiting examples.

Arbiter PUF Circuit Example

Figure 7:
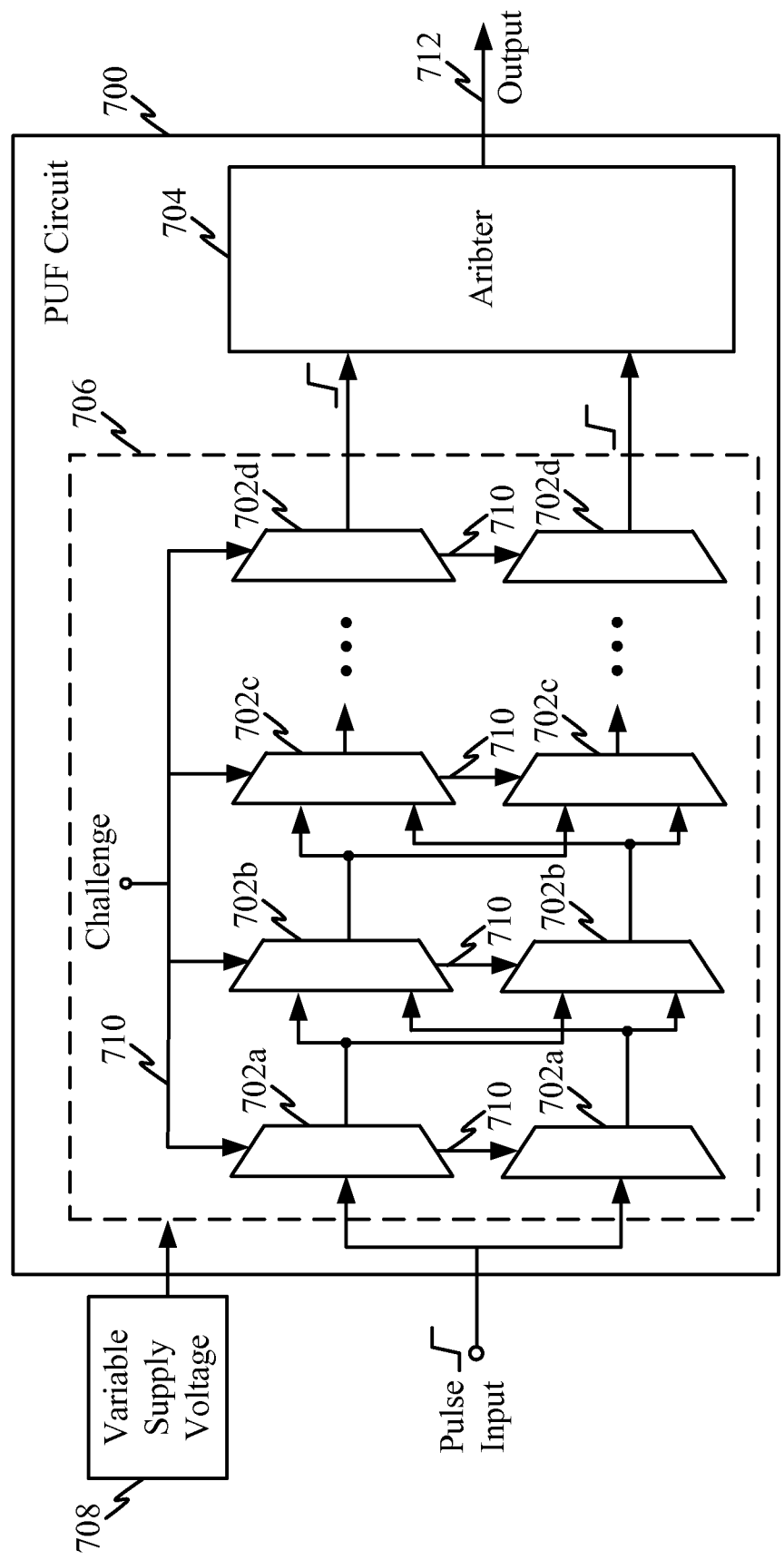
FIG. 7 illustrates a schematic block diagram of an arbiter PUF circuit.

FIG. 7 illustrates a schematic block diagram of an arbiter PUF circuit 700 according to one aspect of the disclosure. The arbiter PUF circuit 700 may be just one example of the circuit-delay based PUF circuit 202 shown in FIG. 2 that can utilize a varying voltage supply to provide additional, unique output responses. The PUF circuit 700 includes a plurality of switches 702a, 702b, 702c, 702d (or other delay elements) and an arbiter 704. The switches 702a, 702b, 702c, 702d comprise a circuit-delay based sample generation module 706, and are supplied by a variable supply voltage 708 capable of providing a supply voltage in varying steps.

The arbiter PUF 700 uses the random component of the delay of the switches 702a, 702b, 702c, 702d that is introduced by uncontrollable manufacturing variations during the production of an arbiter PUF 700 to generate a unique output response. The input challenge 710 selects two symmetrical digital delay lines from the plurality of switches 702a, 702b, 702c, 702d and an input pulse is simultaneously supplied to the first set of switches 702a. The input pulse propagates through the plurality of switches 702a, 702b, 702c, 702d. Due to the semiconductor-level manufacturing variation of the switches 702a, 702b, 702c, 702d there will be a slight difference in the propagation time of both paths and one of the two pulses output by the last pair of switches 702d will reach the arbiter 704 first. The arbiter is an edge-triggered flip-flop that outputs a value (e.g., logical "1" or "0") depending on which of the two pulses triggered it first.

By varying the supply voltage to the switches 702a, 702b, 702c, 702d, different output response values 712 may be obtained by comparing the same switch combination paths that are selected by any one particular input challenge 710. For example, a particular input challenge 710 may cause the selection of a particular pair of symmetric paths for comparison. If the variable supply voltage 708 provides a 1.2 volt supply, the difference between the propagation delays of the symmetric switch paths may be such that a logical "1" is generated as an output response 712 because one particular path's switches have less delay associated with them. However, the supply voltage may then be reduced down to 0.8 volts, which causes the operating speed/frequency of all the switches 702a, 702b, 702c, 702d to slow down. Not only will the reduction in operating speed/frequency save power, but due to nonlinearities and random behavior, the drop in supply voltage may cause one path's switches that were formerly faster to have more delay associated with them compared to the other. This may cause the PUF circuit 700 to flip its output and generate a logical "0" as an output response instead. Since this change cannot be predicted (yet is repeatable every time the same symmetric paths are compared at 0.8 volts for example), the PUF circuit 700 is demonstrably capable of producing an entirely new and unique output response string based on the particular voltage supply level provided.

Delay-Path Analysis Based PUF Circuit

Figure 8:
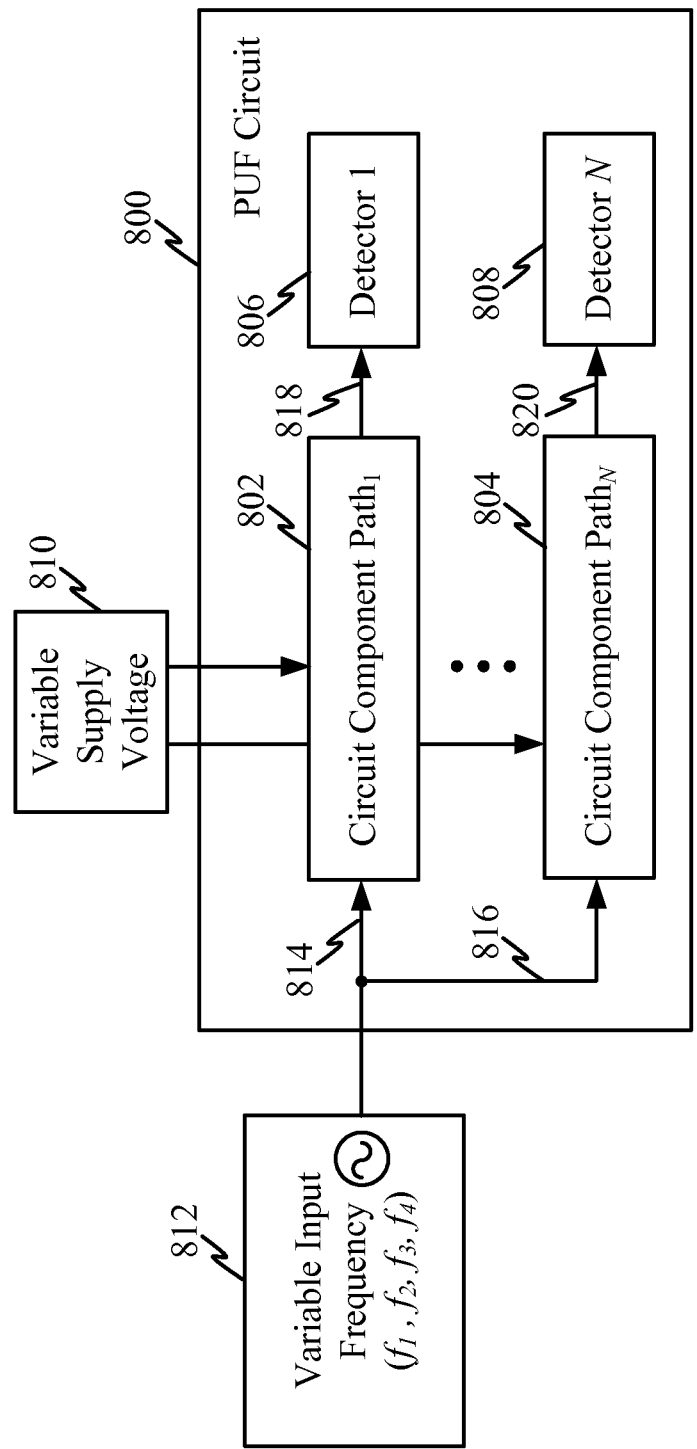
FIG. 8 illustrates a schematic block diagram of a delay-path analysis based PUF circuit.

FIG. 8 illustrates a schematic block diagram of a delay-path analysis based PUF circuit 800 according to one aspect. The PUF circuit 800 may be one example of the circuit-delay based PUF circuit 202 shown in FIG. 2. The PUF circuit 800 includes a plurality of N circuit component paths 802, 804 (where N is an integer equal to or greater than one) and a corresponding plurality of detectors 806, 808. The PUF circuit 800 is supplied by both a variable voltage supply 810 and a variable frequency input 812.

Each path 802, 804 includes a plurality of digital circuit components (e.g., inverters, flip flops, etc.). The paths 802, 804 are not necessarily the same so that each path 802, 804 may have a different number and/or type(s) of circuit components. Thus, each path 802, 804 has its own path delay from its input to its output. Moreover, each path 802, 804 has a maximum operating input frequency at which the input signal 814, 816 can still propagate its way to the output 818, 820 and be detected by the path's corresponding detector 806, 808. The input signal 814, 816 may fail to propagate all the way to the output 818, 820 if this maximum operating input frequency is exceeded.

Due to semiconductor-level manufacturing variation, (almost) identical paths will have some path delay variation from chip to chip. For example, circuit component $path_1$ 802 in one chip may have a slightly different path delay than the same path 802 in another chip. Consequently, circuit component $path_1$ 802 in one chip may have a maximum operating input frequency that is different than the same path 802 in another chip. These characteristics are illustrated in FIG. 9.

Figure 9:
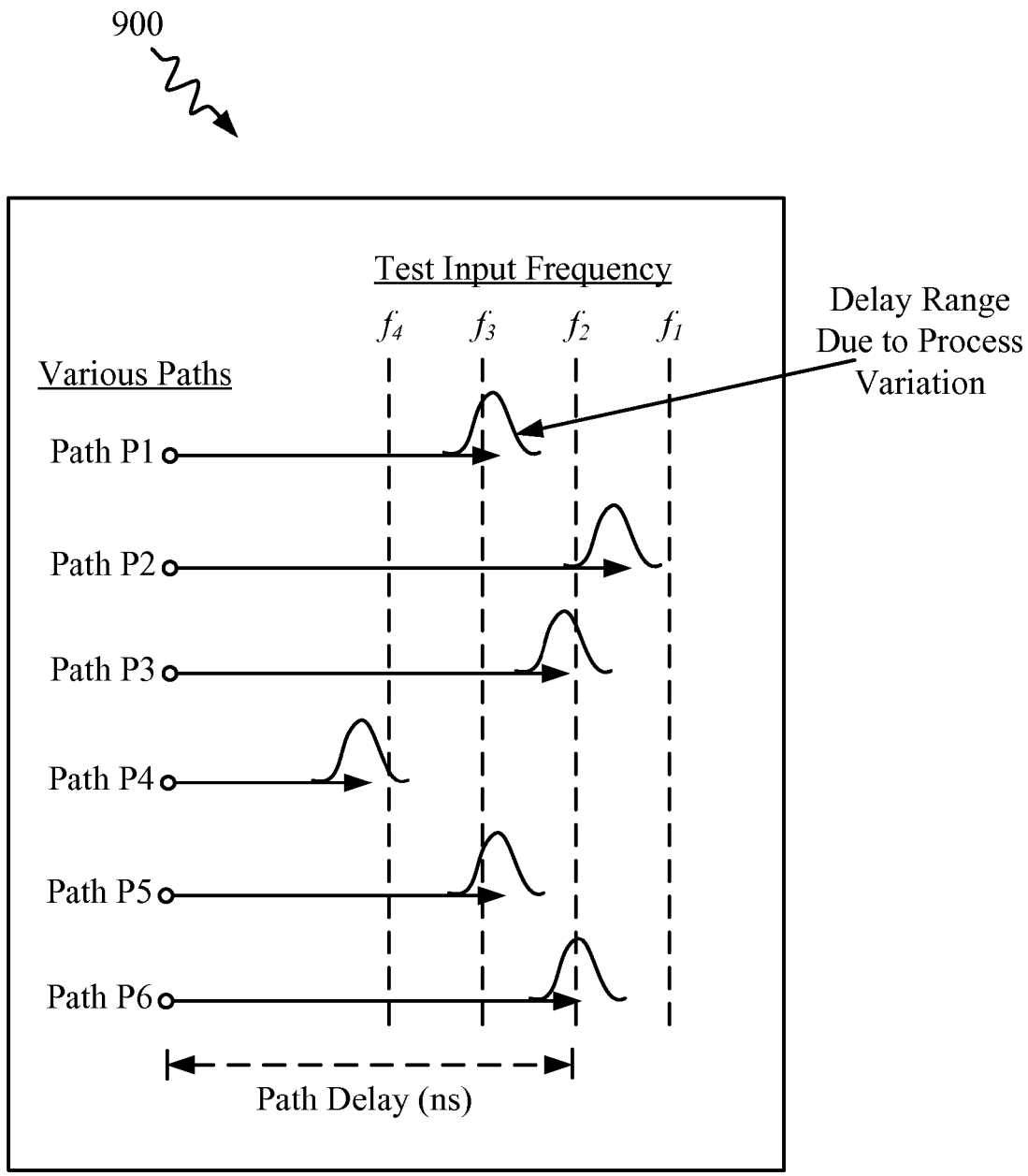
FIG. 9 illustrates a graph of six exemplary circuit component paths.

Referring to FIG. 9, a graph 900 of six (6) exemplary circuit component paths are shown each having a different path delay and therefore a different maximum operating input frequency. All of the paths may properly function (i.e., generate an output) when the input frequency is at $f_1$ since $f_1$ may be the nominal operating frequency of the IC. However, as the input frequency is increased certain paths may fail to propagate their signal. For instance, path P1 may operate properly in every chip at an input frequency $f_2$. However, path P1 may only operate properly in some of the chips at an input frequency $f_3$. Specifically, FIG. 9 shows a "delay range" due to random manufacturing variation for each path among the myriad of chips having the paths P1-P6 such that some chips have shorter path delays than other chips for each path P1-P6.

Thus, going back to the example path P1, some chips have a short path delay for path P1 and thus always operate properly (i.e., propagate the input signal) at an input operating frequency $f_3$ whereas other chips have a longer path delay for path P1 and may always fail to operate properly (i.e., fail to propagate the input signal) at the input operating frequency $f_3$.

Referring to FIGS. 8 and 9, in this fashion, a chip path profile may be created for each chip that uniquely identifies the chip. The chip path profile namely includes the maximum operating frequency of each path 802, 804 of the path-delay based analysis PUF. The frequencies input to each path may be incremented in steps, such as $f_1$, $f_2$, $f_3$, $f_4$, etc. Notably, the chip path profile of each chip may change as the voltage supply provided to the paths 802, 804 is then varied using the variable supply voltage 810. That is, the maximum operating frequency for each path 802, 804 may change in an unpredictable way as the supply voltage is decreased or increased, which provides another dimension of entropy and allows for the generation of a new, unique set of PUF output responses that can be used to generate, for example, keys and/or identifiers. In this fashion, the path-delay analysis based PUF circuit shown in FIG. 8 represents one example of a PUF where the supply voltage and an input frequency may both be scaled (i.e., frequency scaling and voltage scaling) to generate more security information (e.g., more output response bits) using the same PUF circuitry and reducing the need for additional, redundant PUF circuitry.

Figure 10:
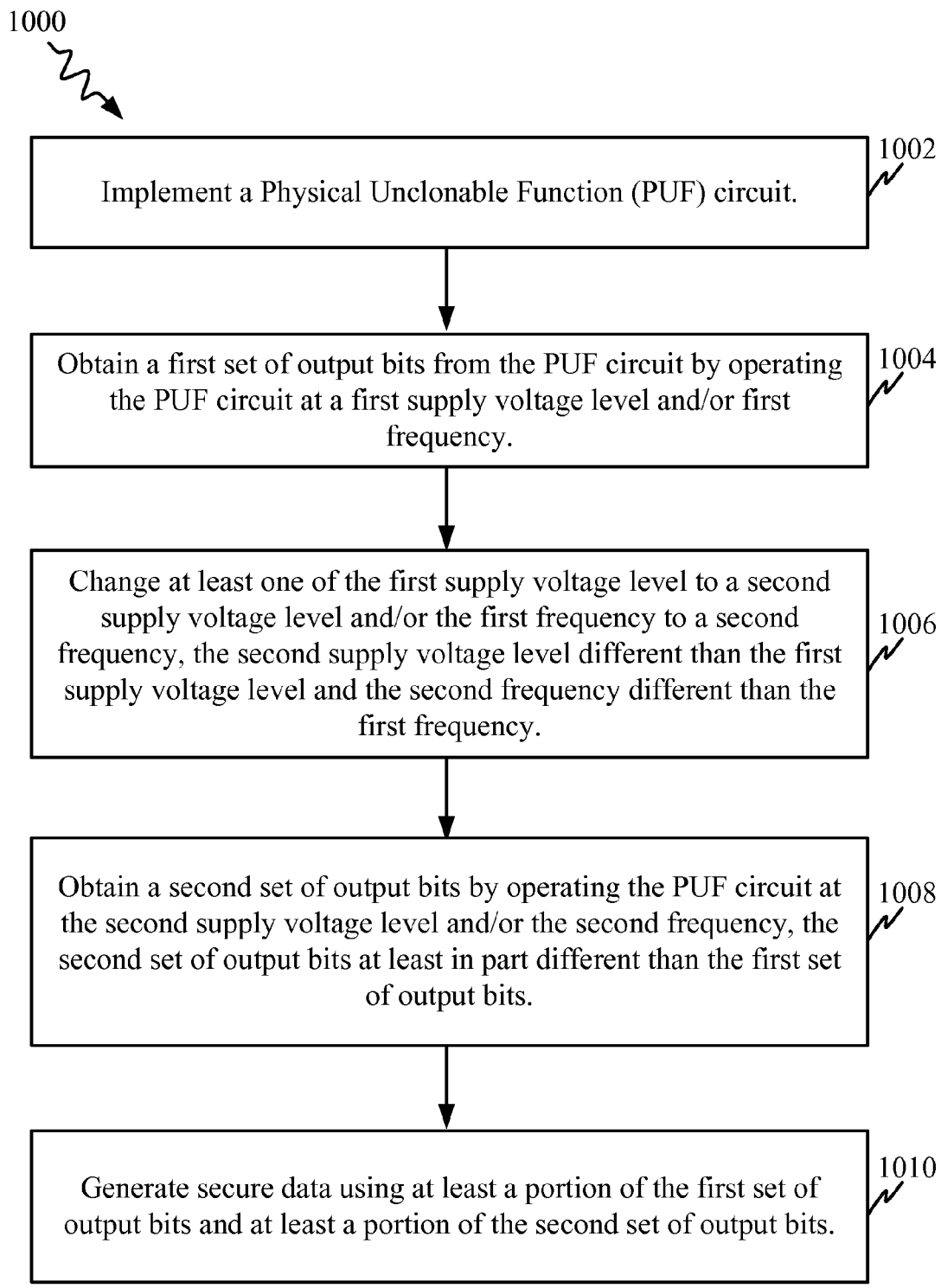
FIG. 10 illustrates a flowchart of a method operational in an electronic device.

FIG. 10 illustrates a flowchart of a method 1000 operational in an electronic device according to one aspect of the disclosure. The method 1000 includes implementing a Physical Unclonable Function (PUF) circuit 1002. Then, a first set of output bits are obtained from the PUF circuit by operating the PUF circuit at a first supply voltage level and/or first frequency 1004. Next, at least one of the first supply voltage level is changed to a second supply voltage level and/or the first frequency is changed to a second frequency, where the second supply voltage level is different than the first supply voltage level and the second frequency is different than the first frequency 1006. Then, a second set of output bits is obtained by operating the PUF circuit at the second supply voltage level and/or the second frequency, where the second set of output bits at least in part different than the first set of output bits 1008. Next, secure data is generated using at least a portion of the first set of output bits and at least a portion of the second set of output bits 1010.

Figure 11:
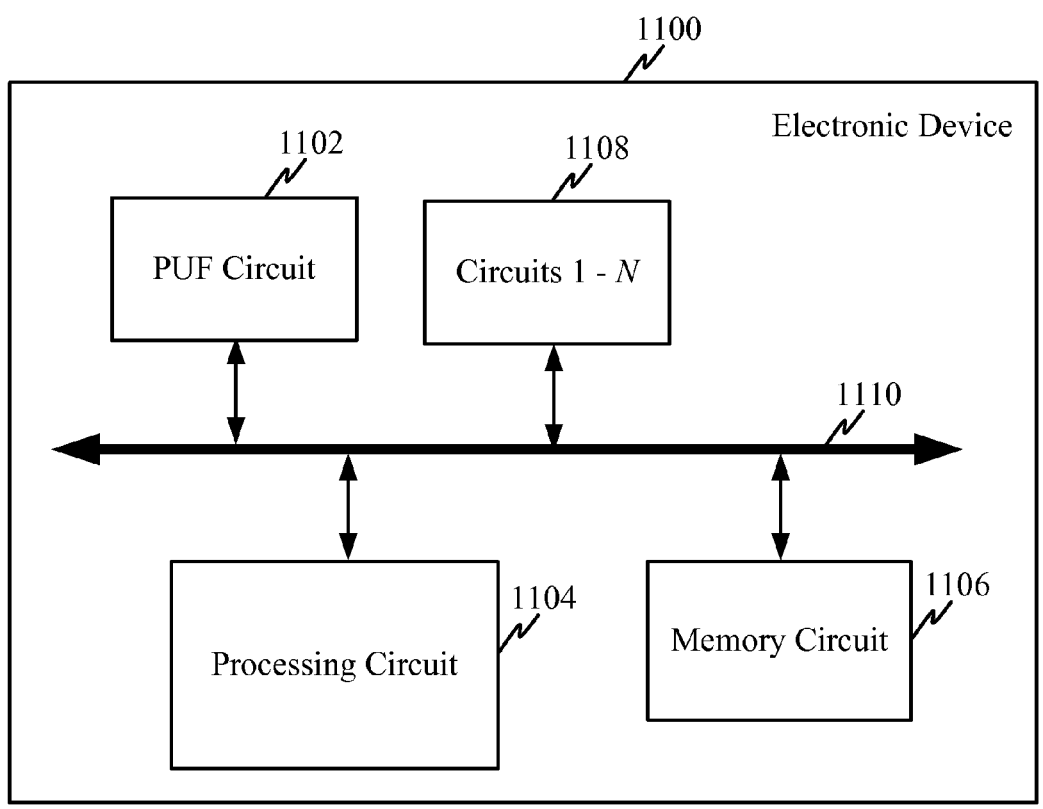
FIG. 11 illustrates a schematic block diagram of an electronic device.

FIG. 11 illustrates a schematic block diagram of an electronic device 1100 according to one aspect. The electronic device 1100 may be any digital electronic device having one or more ICs, such as a mobile phone or a computer. The electronic device 1100 may also instead be itself a single IC. The electronic device 1100 may include a PUF circuit 1102, a processing circuit 1104, a memory circuit 1106, one or more other circuits 1-N 1108, and one or more buses 1110 that interconnect the aforementioned circuits.

The PUF circuit 1102 may be any of the PUF circuits described herein, including the PUF circuits 202, 600, 700, 800 shown in FIGS. 2, 6, 7, and 8. The memory circuit 1106 (e.g., memory) may be volatile and/or nonvolatile memory such as SRAM, DRAM, SDRAM, FLASH, etc. As one example, the memory circuit 1106 may be the memory circuit 206 shown in FIG. 2. The circuits 1-N 1108 may be other circuit components, such as input/output (I/O) circuits, and/or communication interface(s).

The processing circuit 1104 may be a standalone processor (e.g., applications processor) or a processing module within an IC. The processing circuit 1104 may be, for example, the processing circuit 204 shown in FIG. 2. The processing circuit 1104 may serve as a: means for obtaining a first set of output bits from the PUF circuit by operating the PUF circuit at a first supply voltage level and/or first frequency; means for changing at least one of the first supply voltage level to a second supply voltage level and/or the first frequency to a second frequency, the second supply voltage level different than the first supply voltage level and the second frequency different than the first frequency; means for obtaining a second set of output bits by operating the PUF circuit at the second supply voltage level and/or the second frequency, the second set of output bits at least in part different than the first set of output bits; and means for generating secure data using at least a portion of the first set of output bits and at least a portion of the second set of output bits.

One or more of the components, steps, features, and/or functions illustrated in FIGS. 2-11 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 2, 5, 6, 7, 8, and/or 11 may be configured to perform one or more of the methods, features, or steps described in FIGS. 3, 4, 9, and/or 10. The algorithms described herein may also be efficiently implemented in software and/or embedded in hardware.

Moreover, in one aspect of the disclosure, the processing circuit 1104 illustrated in FIG. 11 may be a specialized processor (e.g., an application specific integrated circuit (e.g., ASIC)) that is specifically designed and/or hard-wired to perform the algorithms, methods, and/or steps described in FIGS. 3, 4, 9, and/or 10. Thus, such a specialized processor (e.g., ASIC) may be one example of a means for executing the algorithms, methods, and/or steps described in FIGS. 3, 4, 9, and/or 10. The memory circuit 1106 may be a computer-readable storage medium that may store processor readable instructions that when executed by a specialized processor (e.g., ASIC) (e.g., processing circuit 1104) causes the specialized processor to perform the algorithms, methods, and/or steps described in FIGS. 3, 4, 9, and/or 10.

Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, aspects of the disclosure may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method operational within an electronic device, comprising:
    implementing a Physical Unclonable Function (PUF) circuit;
    obtaining a first set of output bits from the PUF circuit by operating the PUF circuit at a first supply voltage level or first input frequency;
    changing at least one of the first supply voltage level to a second supply voltage level or the first input frequency to a second input frequency, the second supply voltage level different than the first supply voltage level and the second input frequency different than the first input frequency;
    obtaining a second set of output bits by operating the PUF circuit at the second supply voltage level or the second input frequency, the second set of output bits at least in part different than the first set of output bits, wherein the first set of output bits and the second set of output bits are obtained in response to a same input challenge to the PUF circuit; and
    generating secure data using at least a portion of the first set of output bits and at least a portion of the second set of output bits.

2. The method of claim 1, further comprising:
    receiving the input challenge at the PUF circuit from a processing circuit.

3. The method of claim 1, wherein the secure data is generated by concatenating at least the portion of the first set of output bits and the portion of the second set of output bits.

4. The method of claim 1, wherein the secure data is generated using a cryptographic function based on at least the portion of the first set of output bits and the portion of the second set of output bits.

5. The method of claim 1, wherein the PUF circuit is a circuit-delay based PUF circuit.

6. The method of claim 5, wherein the PUF circuit is one of a ring oscillator based PUF circuit, an arbiter PUF circuit, or a delay-path analysis based PUF circuit.

7. The method of claim 6, wherein the PUF circuit is the ring oscillator based PUF circuit, and the method further comprises:
    selecting at least a pair of ring oscillators from a plurality of ring oscillators to obtain the first set of output bits;
    changing the first supply voltage level of the PUF circuit to the second supply voltage level; and
    selecting the same pair of ring oscillators to obtain the second set of output bits.

8. The method of claim 6, wherein the PUF circuit is the arbiter PUF circuit, and the method further comprises:
    selecting a circuit delay path from a plurality of circuit delay paths to obtain the first set of output bits;
    changing the first supply voltage level of the PUF circuit to the second supply voltage level; and
    selecting the circuit delay path to obtain the second set of output bits.

9. The method of claim 1, further comprising:
    increasing the PUF circuit's sensitivity to semiconductor-level manufacturing variation to increase entropy of the PUF circuit.

10. The method of claim 9, wherein increasing the PUF circuit's sensitivity to semiconductor-level manufacturing variation includes:
reducing a power level consumed by the PUF circuit by changing at least one of the first supply voltage level of the PUF circuit to the second supply voltage level or the first input frequency to the second input frequency, wherein the second supply voltage level is less than the first supply voltage level and the second input frequency is lower than the first input frequency.

11. The method of claim 1, wherein changing the first supply voltage level to a second supply voltage level comprises:
selecting the second supply voltage level such that variability in the outputs bits of the PUF ranges from 5% to 15%.

12. An electronic device, comprising:
a Physical Unclonable Function (PUF) circuit; and
a processing circuit communicatively coupled to the PUF circuit, the processing circuit adapted to
obtain a first set of output bits from the PUF circuit by operating the PUF circuit at a first supply voltage level or first input frequency,
change at least one of the first supply voltage level to a second supply voltage level or the first input frequency to a second input frequency, the second supply voltage level different than the first supply voltage level and the second input frequency different than the first input frequency,
obtain a second set of output bits by operating the PUF circuit at the second supply voltage level or the second frequency, the second set of output bits at least in part different than the first set of output bits, wherein the first set of output bits and the second set of output bits are obtained in response to a same input challenge to the PUF circuit, and
generate secure data using at least a portion of the first set of output bits and at least a portion of the second set of output bits.

13. The electronic device of claim 12, wherein the PUF circuit is one of a ring oscillator based PUF circuit, an arbiter PUF circuit, or a delay-path analysis based PUF circuit.

14. The electronic device of claim 13, wherein the PUF circuit is the ring oscillator based PUF circuit, and the processing circuit is further adapted to:
select at least a pair of ring oscillators from a plurality of ring oscillators to obtain the first set of output bits;
change the first supply voltage level of the PUF circuit to the second supply voltage level; and
select the same pair of ring oscillators to obtain the second set of output bits.

15. The electronic device of claim 12, wherein the processing circuit is further adapted to:
increase the PUF circuit's sensitivity to semiconductor-level manufacturing variation to increase entropy of the PUF circuit.

16. The electronic device of claim 15, wherein the processor further adapted to increase the PUF circuit's sensitivity to semiconductor-level manufacturing variation includes:
reduce a power level consumed by the PUF circuit by changing at least one of the first supply voltage level of the PUF circuit to the second supply voltage level or the first input frequency to the second input frequency, wherein the second supply voltage level is less than the first supply voltage level and the second input frequency is lower than the first input frequency.

17. An electronic device, comprising:
means for implementing a Physical Unclonable Function (PUF);
means for obtaining a first set of output bits from the means for implementing the PUF by operating the means for implementing the PUF at a first supply voltage level or first input frequency;
means for changing at least one of the first supply voltage level to a second supply voltage level or the first input frequency to a second input frequency, the second supply voltage level different than the first supply voltage level and the second input frequency different than the first input frequency;
means for obtaining a second set of output bits by operating the means for implementing the PUF at the second supply voltage level or the second input frequency, the second set of output bits at least in part different than the first set of output bits, wherein the first set of output bits and the second set of output bits are obtained in response to a same input challenge to the PUF circuit; and
means for generating secure data using at least a portion of the first set of output bits and at least a portion of the second set of output bits.

18. The electronic device of claim 17, wherein the means for implementing the PUF is one of a ring oscillator based PUF circuit, an arbiter PUF circuit, or a delay-path analysis based PUF circuit.

19. The electronic device of claim 17, further comprising:
means for increasing the means for implementing the PUF's sensitivity to semiconductor-level manufacturing variation to increase entropy of the means for implementing the PUF.

20. The electronic device of claim 19,
whereby changing at least one of the first supply voltage level of the means for implementing the PUF to the second supply voltage level or the first input frequency to the second input frequency reduces a power level consumed by the PUF circuit, wherein the second supply voltage level is less than the first supply voltage level and the second input frequency is lower than the first input frequency.

21. A non-transitory computer-readable storage medium having one or more instructions stored thereon, which when executed by at least one processor causes the processor to:
implement a Physical Unclonable Function (PUF);
obtain a first set of output bits from the PUF by operating the PUF at a first supply voltage level or first input frequency;
change at least one of the first supply voltage level to a second supply voltage level or the first input frequency to a second input frequency, the second supply voltage level different than the first supply voltage level and the second input frequency different than the first input frequency;
obtain a second set of output bits by operating the PUF at the second supply voltage level or the second input frequency, the second set of output bits at least in part different than the first set of output bits; and
generate secure data using at least a portion of the first set of output bits and at least a portion of the second set of output bits.

* * * * *